United States Patent [19]

Carme

[11] 4,415,813
[45] Nov. 15, 1983

[54] AEROGENERATOR HAVING A CONTROLLED AXIS OF ORIENTATION

[75] Inventor: Anne M. Carme, Castres, France

[73] Assignee: AEROPOWER Sarl, Montgiscard, France

[21] Appl. No.: 225,806

[22] Filed: Jan. 16, 1981

[30] Foreign Application Priority Data

Jan. 16, 1980 [FR] France .................. 80 01160

[51] Int. Cl.³ .................. F01D 7/02; F03D 7/04; H02P 9/04
[52] U.S. Cl. ...................... 290/44; 290/55; 416/148; 416/150
[58] Field of Search ............... 416/41, 140 R, 142 R, 416/148, 149–152; 290/44, 55

[56] References Cited

U.S. PATENT DOCUMENTS

| | | |
|---|---|---|
| 2,026,828 | 1/1936 | Dunn . |
| 2,207,964 | 7/1940 | Albers .................. 290/55 |
| 2,273,084 | 2/1942 | Ansley . |
| 2,717,653 | 9/1955 | Emmerson .............. 416/140 A |
| 4,066,911 | 1/1978 | Sarchet . |

FOREIGN PATENT DOCUMENTS

| | | |
|---|---|---|
| 647287 | 10/1934 | Fed. Rep. of Germany . |
| 652209 | 3/1929 | France . |
| 948645 | 8/1949 | France . |
| 2428749 | 1/1980 | France . |

*Primary Examiner*—J. V. Truhe
*Assistant Examiner*—Shelley Wade
*Attorney, Agent, or Firm*—Sandler & Greenblum

[57] ABSTRACT

An aerogenerator is provided with a rotor attached to one end of a variably orientable axis. The axis is, in turn, attached to apparatus for either using the energy produced by the rotatable rotor or apparatus for transforming the energy produced by the rotor. The apparatus includes a system for regulating the velocity of rotation of the rotor as either a function of the force of incident wind on the rotor or as a function of the value of energy which is desired to be produced by the aerogenerator. The system includes a device for automatically controlling the angular movement of the axis as well as a device for measuring the velocity of the rotation of the rotor, whereby the axis can be inclined so that a substantially constant rotational velocity is achieved. A method of regulating the rotational velocity includes measuring the actual velocity, establishing a desired reference velocity, comparing the actual and reference velocities, and altering the orientation of the axis to which the rotor is attached in order to minimize the difference between the measured and reference velocity values.

16 Claims, 12 Drawing Figures

VIEW ALONG F

CROSS-SECTION BB

FIG. 7.

CROSS-SECTION AA

AEROGENERATOR HAVING A CONTROLLED AXIS OF ORIENTATION

BACKGROUND OF THE INVENTION

1. Field of the Invention

The present invention relates to an aerogenerator having a rotor with controlled axis of orientation.

2. Discussion of Prior Art

Known aerogenerators are provided with a rotor carrying blades which are attached in a rigid manner to a shaft rotated by the rotor. These shafts are either connected to a mechanism for transforming the movement or to an electric current generator. The method of rigidly attaching the rotor on the rotating shaft results in flexion of the shaft when winds are gusting. As a function of the force of such wind, this flexion can translate itself into a permanent deformation of the portion of the shaft provided with the rotor.

Furthermore, this method of attachment, as a consequence of sudden variations of wind intensity, causes substantial forces with respect to bearing of the rotating shaft. During startup of the aerogenerator the shaft of the rotor has a tendency to undergo a disordered movement which is harmful to the proper operation of the assembly.

To overcome these disadvantages, the aerogenerators are provided with rotor rotational velocity adjustment apparatus such that when the intensity of wind increases the velocity of rotation of the rotor decreases. In the majority of cases the regulating apparatus is mounted in the rotor and controls the inclination of the blades such that they present a minimum attack surface to the wind when it is violent. The constitution of such a system requires in most cases the use of numerous parts of relatively precise manufacture which serve to weight the blade carrying rotor. Furthermore, such systems require substantial machining for their manufacture and assembly work, which results in a relatively elevated cost.

SUMMARY OF THE INVENTION

The object of the present invention is to overcome the disadvantages set forth above by providing a particular method of attachment of the rotor on the shaft, and by presenting a new rotor velocity regulation system which is simple to fabricate and of little cost. To this end, the present invention is characterized essentially in that the blade carrying rotor is journalled with respect to the shaft or rotating axis and comprises apparatus for softening the forces exerted by the wind on its blades.

According to another characteristic of the invention, the rotor velocity regulation system comprises means controlling the angular movement of the shaft or rotating axis along a direction parallel to that of the winds such that the plane of the rotor is inclined with respect to the vertical from an initial limit position in which it presents a maximum attack surface to the wind to a final limit position in which it has either straightened itself out as a function of the intensity of the winds or in which the plane of the rotor presents a null attack surface or one of minimum value, to incident wind or it occupies an intermediate position between the two limit positions, the variation of the attack surface translating itself into regulation of the velocity of the rotor.

According to another characteristic of the invention, the means for controlling or regulating the angular movement of the rotating shaft are controlled by an apparatus for measuring the velocity of rotation of the rotor.

BRIEF DESCRIPTION OF THE DRAWINGS

Other advantages and characteristics of the invention will appear from reading the preferred embodiments of the invention, given by way of nonlimiting examples, with reference to the annexed drawings in which.

DETAILED DESCRIPTION OF THE DRAWINGS

Figures 1, 2:
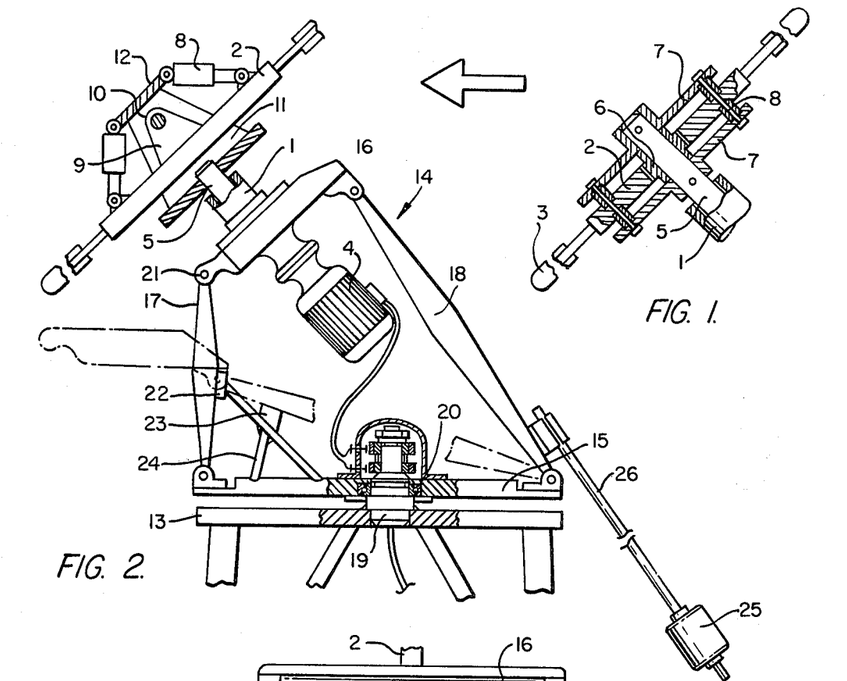
FIG. 1 is a partial sectional view of an aerogenerator according to the invention.
FIG. 2 is a lateral elevational view of the aerogenerator according to the invention.

As shown in FIG. 1, the aerogenerator according to the invention comprises a shaft with a variable orientable axis 1 which is provided at one of its ends with a rotor 2 the rotor has at least one blade 3 and the axis is connected at its other end to either an apparatus 4 (FIG. 2) for directly utilizing the energy produced by the rotation or to an apparatus for transforming of this energy, e.g., an electric generator. The aerogenerator comprises a rotor rotation velocity regulation system which controls the angular movement of axis 1 in a vertical plane which is positioned parallel to the position of the wind, such positioning being carried out either directly or, e.g., by means of a rudder, or indirectly by means of a direction detector which controls an orientation element. The wind motor as described is rotatably mounted through its axis 1 on a pylon.

As shown in FIG. 1, rotor 2 is in the form of a circular plate provided with at least one removable radial blade 3; the blade is positioned at adjustable wind attack angle and is attached to the periphery of the plate by any means known to the routineer. To avoid permanent deformation caused by bending of rotating shaft 5 of the rotor, which is connected to the axis 1 by known means, which deformation is itself caused by the action of a gust of wind exerted on the blades of the rotor, and to avoid that such very brief action does not transmit itself onto the bearings of the rotor, the shaft is mounted thereon in journalled fashion and is provided with a shock absorption system.

To this end, the rotor 2 is mounted on a swivel joint 6 whose interior ring is attached on the rotating shaft 5 and is positioned between two circular walls or disks 7 perpendicular to shaft 5 on which the axis is attached and which is concentric thereto. Between these two walls, in cooperation with rotor 2, are mounted the shock absorption apparatus 8. These apparatus are preferably present in the form of cylinders of flexible and elastic material, e.g., rubber, and are mounted on and against both sides of the rotor and parallel to rotating shaft 5.

According to a preferred embodiment, the shock absorption elements are positioned two-by-two axially aligned; they are mounted on both sides of the rotor and engaged therein by one of their ends. Each of the shock absorption element pairs is attached to the walls 7 and to the rotor 2 by a bolt engaged in a transverse orifice of these elements and is provided with a tightening screw. One easily appreciates that the shock absorption elements will absorb any shocks created by a gust of wind on the blade, and diminish the flexion work of the rotating shaft under the influence of these shocks. Furthermore, experience has shown that this arrangement makes it possible to avoid, during startup of the rotor, disordered movement of the rotating axis 5.

According to another embodiment, shown in FIG. 2, the rotor is provided with two blades 3 and is present in the form of a cylindrical shaft positioned transversely with respect to the rotating shaft 5, such that their axes of symmetry are secant. This rotor, as in the example of the embodiment described above, is journalled with respect to shaft 5 and comprises shock absorption elements 8. To this end, the cylindrical shaft constituting the rotor is provided with journal means, e.g., planar wall 9, or a connecting rod having a journal axis 10 which is perpendicular to rotating shaft 5 and to rotor 2. This axis 10 is carried by cap 11 attached at the end of rotating shaft 5 and between the walls on which rotor 2 is mounted. The cap 11 is provided with a transverse arm 12 carrying at one end a shock absorption element 8 which cooperates with rotor 2. In this embodiment, the element 8 preferably comprises a hydraulic shock absorber, but it is self-evident that it can comprise any other device fulfilling the same function. The velocity of rotor 2 is regulated by a system which prevents the destruction thereof under the action of a violent wind. This system comprises means for controlling the angular movement of axis 1 and of shaft 5 of the rotor which is connected to axis 1 along a direction parallel to the direction of the wind; when the wind increases in intensity such that the plane of the rotor is inclined with respect to the vertical it moves towards the rear and from an initial limit position facing the wind where it presents a maximum attack surface to the wind. It straightens to come to occupy, as a function of the intensity of the wind, either a final limit position, or a position in which it presents a null attack to the wind or a surface of minimum value to the wind, or in which it occupies an intermediate position between the two limit positions. The variation of the position of the attack surface to the wind of the plane of the rotor or of its blades results in regulation of the velocity of rotation of the rotor, either so as to obtain a constant velocity of rotation or so as to obtain a desired velocity of rotation in relation to the value of energy needed. In FIG. 2 journalled rotor 2 is shown with an embodiment of the regulation system.

According to this embodiment, the aerogenerator is mounted at the end of a vertical pylon on which a horizontal platform is attached, as described previously. On platform 13 a deformable structure 14 is mounted which is provided with a generator 4 of axis 1 of rotor 2. This structure is movable around the vertical so as to allow the plane of the rotor to position itself under the wind. It comprises a lower horizontal plate 15, which is connected to an upper plate 16 by at least two connecting rods 17 and 18 journalled to said plates.

The lower plate 15, of circular polygonal or other shape, is provided with a cylindrical orifice in which means 19 for pivoting the structure around the vertical is engaged. This means comprises a cylindrical macaroon with a vertical axis integral with platform 13 and projecting thereon. On this macaroon, and between platform 13 and plate 15, is forceably mounted a turning element 20 which is capable of absorbing radial and normal forces. One of the rings of element 20 is integral with the platform and with the other lower plate 15 of structure 14. This mounting, known to the routineer, while assuring rotation of the structure around the vertical, permits it to be linked in translation to platform 13, which avoids any risk of disassociation of the structure from the vertical pylon.

Figure 3:
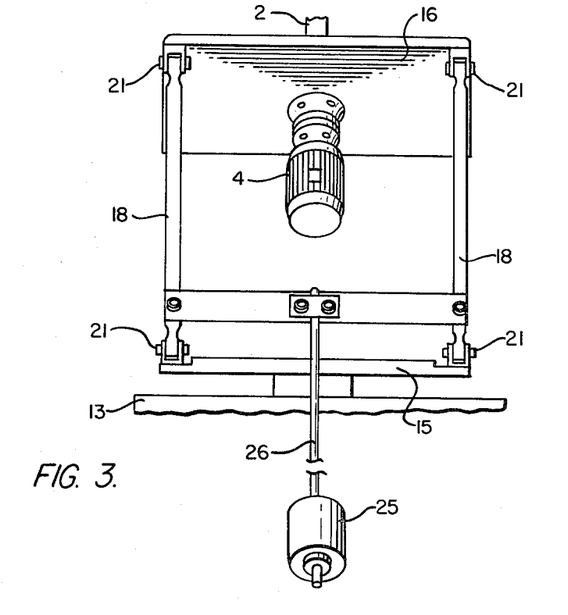
FIG. 3 is a partial sectional view of the aerogenerator facing the wind according to FIG. 2.

Lower plate 15 is provided with at least two journal points for connecting rods which connect plate 15 to upper plate 16. These journal points each comprise a cap provided with a horizontal journal axis which is transverse to the wind direction such that the connecting rods are moved with respect to the plate in a rotational movement, this movement occurring along a vertical plane parallel to the direction of the wind. Preferably, the deformably structure comprises parallel sets of two connecting rods 17 and 18 of unequal length, each journalled to the lower plate and to the upper plate, which are each provided with four journal points 21 (FIG. 3).

Upper plate 16 is of polygonal or circular form and is provided at its center with an orifice for passage of the casing of axis 1 in a perpendicular direction to the plate. This casing is attached to plate 16 by a bit by any known means. In the space defined by the deformable structure generator 4 is mounted and is preferably attached to the lower surface of the plate 16. Each of the sets of connecting rods 17 and 18 define, with plates 15 and 16, a deformable polygon, and more particularly a deformable quadrilateral whose plane is vertical and parallel to the direction of the wind. The sides of this quadrilateral, defined by the set of connecting rods 17 and 18 and by each of the plates 15 and 16, are dimensioned in such ways that during the deformation of the quadrilateral, plate 16, which is initially inclined with respect to the vertical, comes into a final position in which it is positioned horizontally, as shown in dashed lines in FIG. 2. In the embodiment of the assembly described, plate 16, in its initial position, is inclined at 60° with respect to the horizontal, but it is self-evident that the value of this angle is given here only by way of example. Plate 16, during the deformation of structure 14, is caused to move rotationally around a horizontal axis and transversely to the direction of the wind; the axis is moved translationally, transversely to the direction of the wind, and along a curved line in which is directed towards lower plate 15. The passage of axis 1 from the initial position, where it is inclined with respect to the vertical, into the vertical position, occurs angularly along a vertical plane parallel to the direction of the wind. This angular movement occurs around a translatable movable axis which is positioned facing the wind. Axis 1 then straightens so as to be positioned vertically and is angularly movable along a direction inverse to that of the wind.

To limit movement of the axis 1, deformable structure 14 is provided with shoulders 22 and 23, carried by an arm 24 attached to the lower plate 15, and cooperate, respectively, with connecting rods 17 and 18. These shoulders are preferably adjustable in order to fix limit positions of the axis 1. Preferably, structure 14 is provided with at least one element for returning the axis to the initial position. Preferably, this return element comprises a removable counterweight 25 carried by an arm 26 positioned in the extension of the plane defined either by the two connecting rods 18 or by the plane parallel thereto, and which is integrally connected to the structure by any known means. The action of the wind on the rotor blades will cause the rotation thereof and the deformation of structure 14 which comprises the regulation system. As a function of the intensity of the wind, axis 1 will straighten itself so as to more or less vary the angle of attack of the plane of the rotor, and consequently its velocity of rotation. This straightening movement is counterbalanced by the counterweight action, which allows for the equilibration of the assembly in its limit or intermediate position, as a function of the force exerted by the wind on the rotor blades.

According to another embodiment of the invention, inclination means of the axis 1 are controlled by a rotor rotation velocity measurement apparatus, which if necessary depending upon the result of the measurement, controls the inclination means such that they act on the inclination of axis 1 to cause a variation in the surface of attack to the wind in such a manner that the velocity of rotation of the rotor remains substantially constant, e.g., irrespective of the variation of wind intensity or of energy demand.

Figure 4:
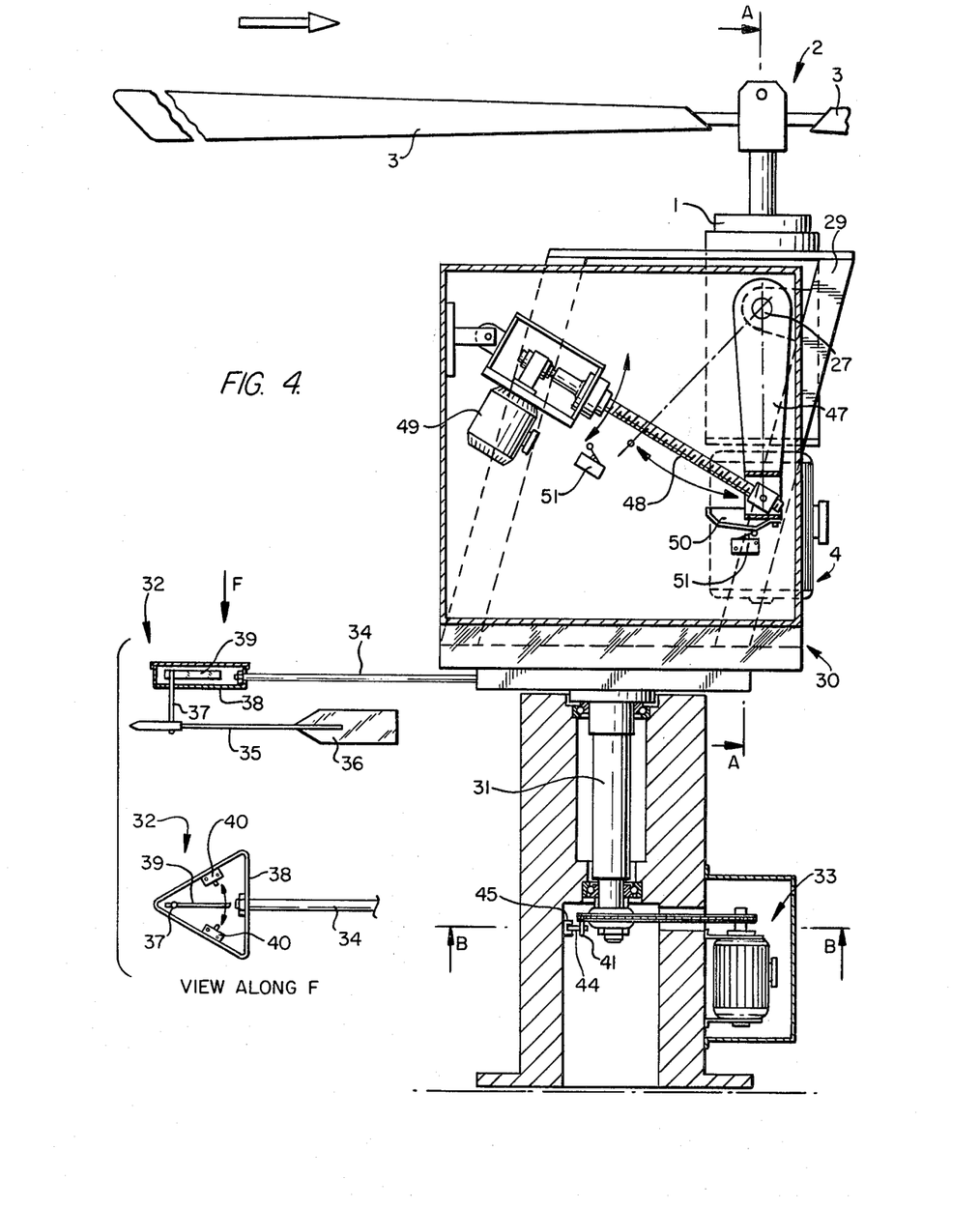
FIG. 4 is an elevational view, in partial cross-section, of a second embodiment of an aerogenerator according to the invention.

As shown in FIG. 4, variable orientation axis 1 is journalled in rotation around a horizontal axis 27 in a vertical plane situated between vertical uprights 28 and 29 of structure 30. Preferably, the uprights 28 and 29 are inclined towards the rear with respect to the vertical such that, in the substantially vertical position of the rotor, the runner of the pylon is spaced from the rotor. The structure 30 is mounted in a known fashion at the end of a vertical shaft 31, which turns on itself in a manner which is adapted to allow for a positioning of a vertical plane in which variable orientation axis 1 is moved by pivoting around shaft 31 along a direction parallel to the wind.

To this end, the aerogenerator according to the invention comprises at least one wind direction detector device 32 which transmits, in a known manner, information to shaft rotating means 33. Drive means 33 is preferably a motoreducer connected in a known fashion, e.g., by means of a chain and pinions, to the end of shaft 31.

The wind direction detector device 32, which is preferably attached at the end of a shaft 34, which is in turn connected to structure 30 parallel to the vertical plane in which the variable orientation axis 1 is moved, preferably comprises a shaft 35 provided at one of its ends with a small blade 36 and attached at its other end to a vertical axis 37 pivotably mounted on unit 38. On the interior of unit 38 a plate 39 is connected integrally at one of its ends to axis 37. Depending upon the orientation of the small blade 36 in the horizontal plane in which it is moved, the orientation is obtained along the direction of the wind, and plate 39 is adapted to angularly move to activate one of microcontacts 40, which are attached to both sides of plate 39. Each of the microcontacts is connected in a known fashion, such as by a ring collector or by telecontrol, to the rotation movement control unit of motoreducer 33.

Depending upon the microcontact activated, the motoreducer 33 acts so as to pivot the structure 30, and thus the wind direction detector device 32 in a well defined direction, dependent upon the microcontact activated, until the microcontact is no longer activated; this corresponds to a positioning of the vertical plane in which the variable orientation axis 1 is moved substantially parallel to the direction of the winds. So as to obtain a relatively precise position parallel to the direction of the wind of the vertical plane in which axis 1 rotates, the two microcontacts 40 are attached at a distance from one another which is substantially greater than the thickness of plate 39.

According to another preferred embodiment, each of the microcontacts is connected by cables to the electric control unit of the motoreducer 33 for rotatably driving shaft 31, which under the circumstances is susceptible only to a complete turn on itself or a bit more than a complete turn.

The orientation of the vertical plane in which orientable axis 1 is inclined is performed in the following manner, and with the aid of the following means (see FIGS. 5, 6). Finger 41 is connected in known manner to shaft 31 and parallel to the axis of rotation thereof. Preferably, finger 41 is attached perpendicularly to disk 42 and linked in a known manner perpendicular to shaft 31. Disk 42 is the circular planar surface of the toothed wheel of the rotational drive of shaft 31, which cooperates by chain, for example, with motoreducer 33. Finger 41 is attached to disk 42 in a fictional vertical plane passing through the axis of rotation of shaft 31 and which contains direction detector device 32, as well as the vertical plane in which the orientable axis is adapted to move. Finger 41, during its controlled rotation with shaft 31 around the axis thereof, is adapted to move to activate a small blade 44 journalled around vertical axis 45; this axis is situated exteriorly of the circular trajectory described by finger 41 during the rotation and is positioned radially with respect to the axis of rotation of shaft 31 and in a substantially horizontal plane secant to the axis of finger 41. On both sides of small blade 44 microcontacts 46A and 46B are attached and are adapted to be activated individually by the small blade during its pivoting movement around axis 45. The pivoting is caused, as described previously, by finger 41. This arrangement stops and then reverses the rotational movement of finger 41, and thus of direction detector device 32, in a manner such that device 32 cannot perform several turns around the axis of shaft 31 and such that the cable connecting microcontacts 40 of the device to the electric control unit of the motoreducer 33 is not excessively torsionally biased, which would cause its rupture. The operation of the apparatus positioning system 32 facing the wind will be better understood after the following description with reference to FIG. 5, of an example of positioning device 32 so as to face the wind.

Figure 5:
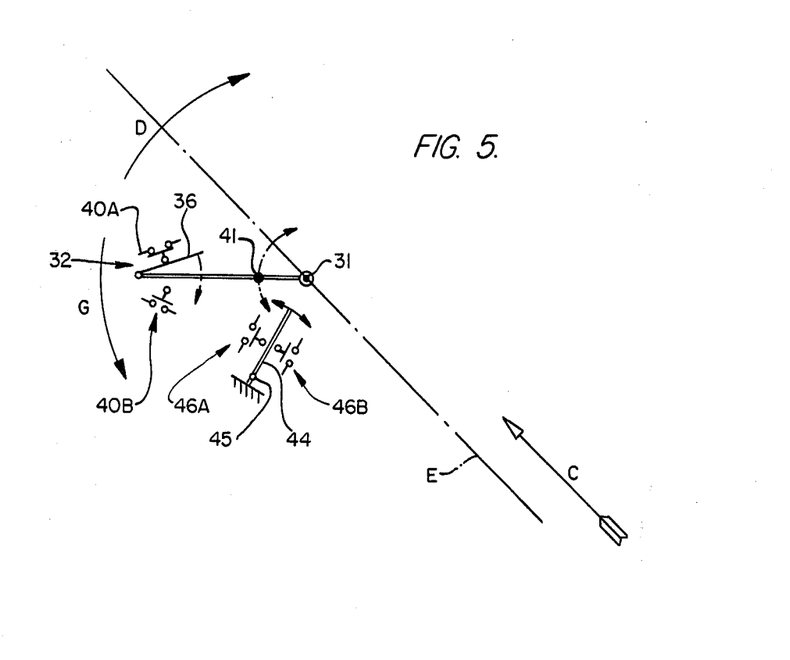
FIG. 5 is an overall view of the orientation device of the aerogenerator with respect to the wind.
Figure 6:
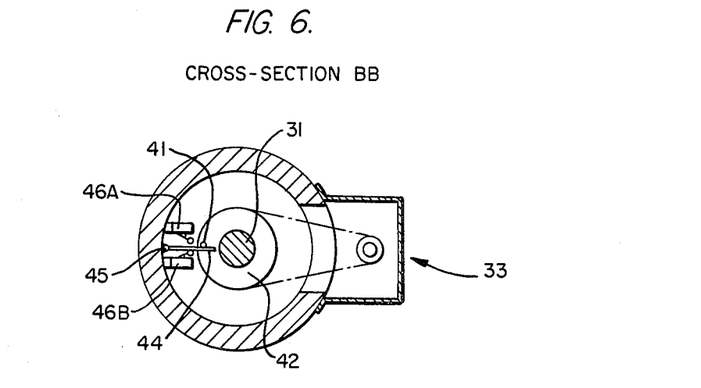
FIG. 6 is a view of FIG. 4 taken along reference line B—B.

As shown schematically in FIG. 5, wind direction detector device 32 is located, e.g., at rest in any position. A wind blowing in the direction shown by arrow C raises itself driving angularly the shoulder of small blade 36 of the device angularly until it then activates microcontact 40A. The microcontact 40A controls by means of an electric unit (not shown), motoreducer 33 such that the device 32 is adapted to come as quickly as possible by rotation to occupy a position facing the wind. If device 32 were positioned with respect to vertical plane E parallel to the direction of the wind so as to pass through axis of rotation of the shaft 31 of the side of the said plane where the small blade 44 is not found due to the limitation of angular movement of shaft 31, small blade 36 of device 32 will have activated the microcontact 40B and device 32 will have been directly brought into a position facing the wind by angular rotation of the lower value, that is to say along arrow D. But if as shown in FIG. 5, device 32 is situated with respect to plane E on the side where the small blade 34 is located to limit angular movement of the shaft 31 on which it is located. Apparatus 32, which is rotated by the motoreducer, moves by virtue of angular rotation of a smaller value to face the wind; this corresponds to the direction of rotation shown by arrow G, and the device will be stopped in its movement when finger 41, situated in the same vertical plane as the device, activates small blade 44 which limits angular movement of shaft 31. The small blade 44 in the case shown in FIG. 5, serves to activate microcontact 46B.

Microcontact 46B controls, by means of the electric unit (not shown) and motoreducer, stoppage of the reversal of rotational movement of device 32. The action of the microcontact 46B assumes priority with respect to microcontact 40A for control of the motoreducer 33, until the microcontact 40A is no longer activated, which corresponds to the passage, by rotation along the direction shown by the arrow D from the other side of the said plane E, where contact 40B is activated in its turn, and thus allows, as described previously, control of the motoreducer 33 in the same direction of rotation, i.e., in the direction shown by the arrow D, until microcontact 40B is no longer activated in its turn, which corresponds to the desired position of device 32 into a position facing the wind.

Figure 7:
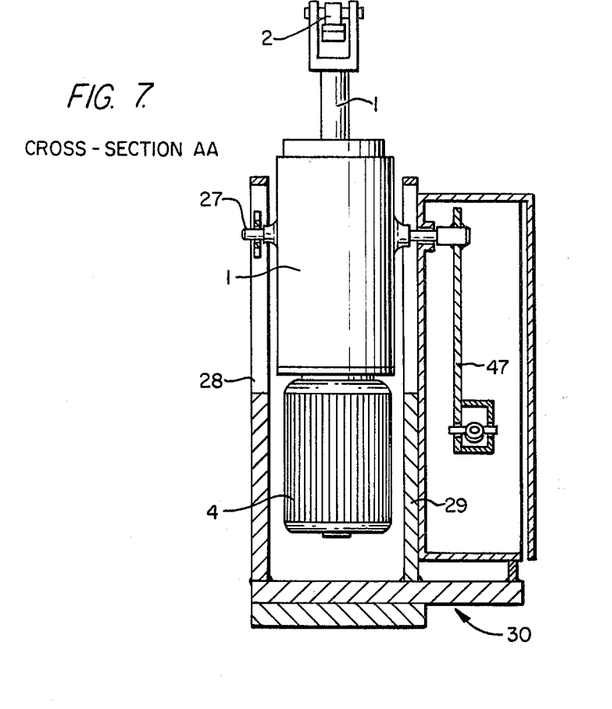
FIG. 7 is a view of FIG. 4 taken along reference A—A.

According to another preferred embodiment, the means for controlling angular movement of the variable orientation axis 1 around journal axis 27 comprises a rotating arm 47 connected at one of its ends to the variable orientation axis 1 in a known manner so as to drive it in rotation around its journal axis during pivoting controlled by arm 47 around a horizontal axis parallel or intersecting with the arm and a rotation driving device of said arm. Preferably, and as shown in FIGS. 4 and 7, arm 47 is directly connected to the orientable axis 1 so as to simultaneously pivot around the horizontal axis 27.

Figures 9, 10:
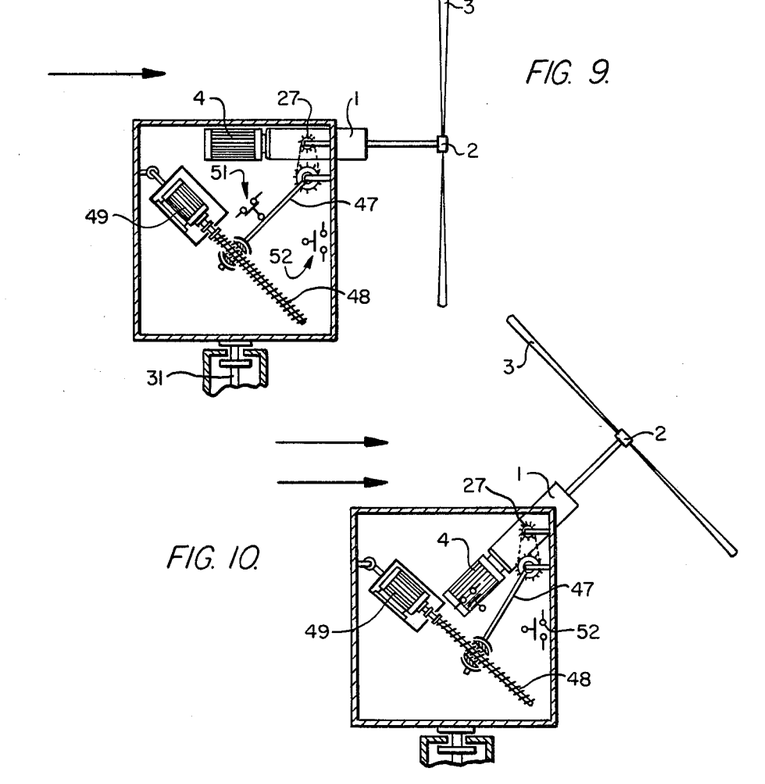
Figure 11:
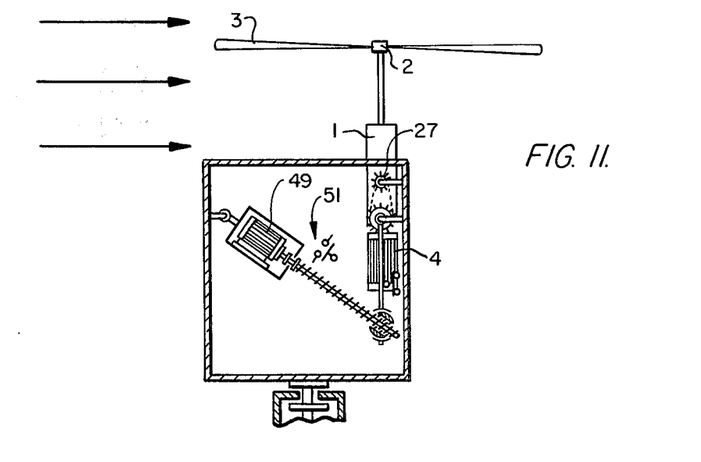
Figure 12:
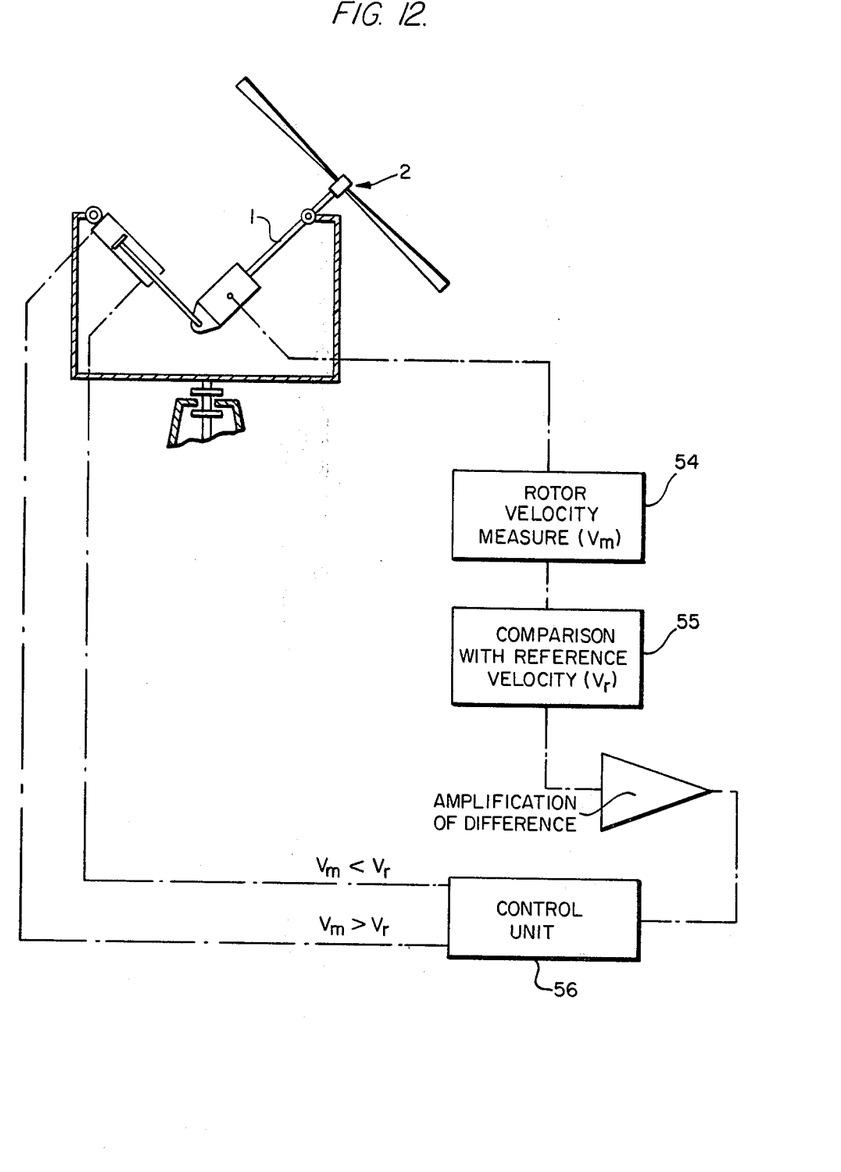
FIG. 12 is a schematic view of the process of regulating rotor velocity.

According to other embodiments, such as shown in FIGS. 9, 10 and 11, arm 47 is pivotably mounted around an axis parallel to rotation axis 27 of orientable axis 1, axis 1 connection between the and arm 47 being achieved by any known means, e.g., by pinions and chains, or by gears, in a manner so as to amplify the deflection of arm 47. The rotational driving apparatus of the arm preferably comprises a screw jack 48 controlled in rotation by motoreducer 49, and provided at each of its ends with a journal connecting it on one hand to the end of arm 47 and on the other hand to structure 30. Arm 47 is provided with cam 50 so as to activate microcontacts 51 at the said end of its path, which correspond to the maximum angular positions of orientable axis 1. The positions preferably comprise a horizontal axis position, which corresponds to a maximum wind attack surface, and a vertical or almost vertical axis position, which corresponds to the minimum wind attack surface.

Figure 8:
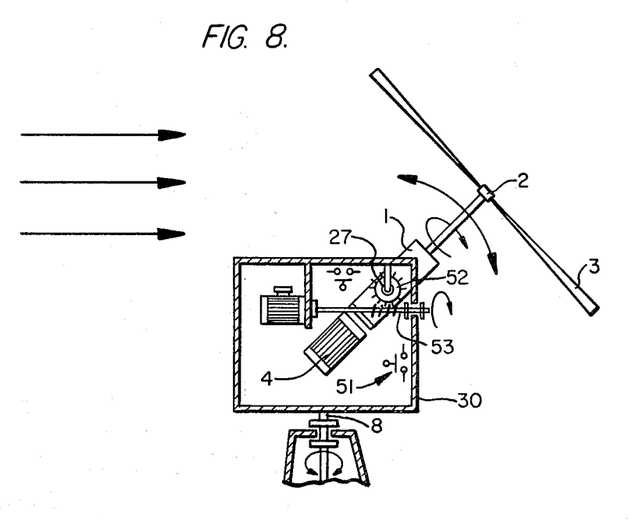
FIGS. 8, 9, 10 and 11 are schematic views of embodiments of the invention.

According to another embodiment, means for inclining the variable orientation axis 1, e.g., as shown schematically in FIG. 8 the angular movement of the said axis 1 is obtained by means of a wheel and endless screw device whose toothed wheel 52 is attached in a known fashion to the axis 1 and whose journal axis 27 cooperates with endless screw 53, which is rotated by any known means, e.g., by a motoreducer. Microcontacts 51 cooperate with shoulders connected to axis 1 so as to signal as previously described the end of path positions corresponding, on the one hand, to a horizontal position of axis 1, and on the other hand to a vertical position of the same axis. Irrespective of the embodiment of the means for inclining axis 1, they are controlled by a device 54 for measuring the velocity of rotation of the rotor, which, depending upon the result of the measurement, controls when necessary the axis inclining means such that they act on the inclination of the axis 1 to cause a variation in the surface of attack of the wind in such a manner that the velocity of rotation of the rotor remains substantially constant irrespective of the variation of wind intensity. Alternately, the wind velocity is controlled in a manner so as to regulate its velocity as a function of the power required. The process of regulation of the velocity of rotation of aerongenerator rotor 2, as previously described, consists of measuring by any known means 54 temporarily or in a permanent fashion, the velocity of rotation (Vm) of rotor 2 in a direct or indirect manner. The velocity measurement is then compared, by means of an electric or electronic unit 55, with a predetermined electric value, and is fixed by the constructor and corresponds to a reference velocity (Vr). If there is a difference between the velocity of rotation measured (Vm) and the reference velocity (Vr), an electric or electronic unit 56 controls the angular rotational drive means of orientable axis 1 in a manner so as to present a larger wind attack surface if the velocity measured (Vm) is less than the reference velocity (Vr), or a reduced wind attack surface if the velocity measured (Vm) is greater than the said reference velocity (Vr); in either case the unit 56 controls the position of axis 1 until the difference between the velocity measured (Vm) and the reference velocity (Vr) is zero.

According to another preferred embodiment, the measurement device 54 comprises a measurement means for measuring the frequency of the alternating current produced by electric generator 4, which is driven by the said rotor 2. To this end, the frequency of the current, which is a function of the velocity of rotation of the rotor, is preferably measured by means of an electronic system comprising a monostable flip-flop; the magnitudes of the impulses of the flip-flop which are preliminarily defined are set off at any point of the wave or the half-wave of the alternating current produced by the generator. The impulses thus produced are preferably counted electronically, in a known manner, which will permit determination of the frequency of the alternating current produced by generator 4 and thus the velocity of rotation of the rotor. The frequency of the alternating current which is produced by the generator, and thus predetermined, or the number of impulses counted over a predetermined time is compared with a reference frequency or with a number of reference impulses. The comparison will allow detection of any difference which exists between the measured velocity of rotation of the rotor and the reference velocity fixed by the operator and control, if any difference exists of the means before angularity and rotably driving the orientable axis 1 in a manner according to the process as previously described.

According to an alternative embodiment, the impulses set off by the monostable flip-flop at any point of the wave or the half-wave of the alternating current produced by generator 4, are integrated in a manner so as to furnish a continually varying voltage which is measured directly, and in a known manner, so as to determine the frequency of the alternating current and thus the velocity of rotation of the rotor.

According to other embodiments the measurement of the frequency of the alternating current produced by electric generator 4 is carried out by any known means, such as by a frequency meter having vibrating blades, or an electronic frequency meter, or by means of a frequency discriminator.

According to another embodiment, device 54 comprises a means for counting electrical impulses produced by a rotating element driven by the rotor, e.g., a chopper or magnetic mass, cooperating in a known manner with an appropriate means for producing electric impulses e.g., an electric change of state oscillator at each passage of the rotating element, or photoelectric cells positioned on both sides of the chopper, or a magnetic field detector, such as a "Hall" effect or a magnetoresistance system.

According to another embodiment, device 54 comprises a means of measuring the voltage leaving a principle electric generator driven by the rotor for an industrial or domestic use, or of measuring the voltage leaving an auxiliary generator delivering a voltage which is a function of its velocity of rotation e.g., a tachometric generator. The means of measuring the voltage is a device of a known type e.g., a voltmeter.

According to another embodiment, 54 comprises means of measuring the flow of a fluid, such as a flowmeter, connected in a known manner to the output of an apparatus such as a pump, a turbine or a hydraulic motor which is either directly or indirectly driven by the rotor.

According to another embodiment, the measurement apparatus of the velocity of rotation of rotor 2 comprises a means of measuring the pressure of a fluid, such as a manometer connected in a known manner to the output of a gaseous or non-gaseous fluid flow apparatus which is either driven directly or indirectly by the rotor. The said apparatus can be, e.g., a pump, a turbine or a hydraulic motor.

According to another characteristic of the invention the apparatus coupled to the said aerogenerator is momentarily utilized for the startup of the aerogenerator, when the startup occurs during low wind intensity so as to start the rotational movement of the rotor. To this end, in the case where the driven apparatus 4 is an electric generator, the generator is momentarily utilized as an electric motor which is furnished momentarily, alternating electric current by means of, e.g., an inverter so as to achieve the startup of the rotor 2.

According to an alternative embodiment, the aerogenerator is provided with an independent starter, such as a starter of the type utilized in the automobile industry for example, cooperating momentarily and in a known manner with the rotor to start the rotor if necessary e.g., by means of a toothed crown attached to the axis of the rotor. Preferably all of the movable elements of the aerogenerator, the orientable axis 1 excepted, including the rotor 2 which is provided with blades and the wind direction detector apparatus are protected from inclemency by means of a box which is preferably hermetic and lockable. Similarly all of the electric circuits and devices for electronic or electrical measurement, comparison and control units are housed in the box.

The aerogenerator according to the present invention, contrary to known aerogenerators, can be used without danger, even when the winds attain high velocities on the order of more than 100 km/hour, e.g., where the quasi-horizontal position of the plane of rotation of the flapping blades, by virtue of their journalling which allows rotor 2 to continue to turn at a substantially constant speed and thus to produce energy, constitutes a position in which apparatus 4 is protected. It is self-evident that the invention is not limited to the different embodiments which have just been described, which have been given only by way of purely illustrative but not limiting example.

The present invention can comprise additions and alternatives within the range of equivalent techniques without going beyond the scope of the present patent.

We claim:

1. An aerogenerator comprising:
   (a) a rotor having at least one blade;
   (b) a cap in which said rotor is journalled;
   (c) hydraulic shock absorbers cooperating with said cap and positioned along opposite sides of an axis on which said rotor is journalled, said axis having a variable orientation;
   (d) a swivel joint positioned between said rotor and said axis;
   (e) two circular walls positioned on opposite sides of said rotor and being connected by said hydraulic shock absorbers;
   (f) a deformable quadrilateral structure attached to said axis, said quadrilateral structure comprising a first connecting rod, a second connecting rod having a length different than the length of said first connecting rod, a lower plate adapted to rotate about a vertical line, and an upper plate adapted to carry said rotor and said generator.

2. An aerogenerator in accordance with claim 1 wherein said lower plate is a generally horizontal plate attached to a horizontal platform, said platform being supported by at least one vertical pylon.

3. An aerogenerator in accordance with claim 2 further comprising a removable counterweight attached to said deformable quadrilateral via an arm, said removable counterweight serving as a counterbalance.

4. An aerogenerator in accordance with claim 3 further comprising shoulders for limiting movement of said deformable quadrilateral when said rotor is subjected to incident wind.

5. An aerogenerator comprising:
   (a) a rotor having at least one blade;
   (b) a variably orientatable axis member which is attached at one end to said rotor, said axis being movable in the vertical plane and being supported by a structure movable in a horizontal plane;
   (c) means for mounting said rotor on said access member and for permitting oscillatory movement of said rotor;
   (d) a device adapted to utilize energy produced by said aerogenerator; and
   (e) a system for regulating the velocity of rotation of said rotor.

6. An aerogenerator in accordance with claim 5 wherein said device comprises an electric generator.

7. An aerogenerator in accordance with claim 5 wherein said device comprises means for transforming energy produced by said aerogenerator.

8. An aerogenerator in accordance with claim 5 wherein said system for regulating the velocity of rotation of said rotor controls said velocity as a function of the force of incident wind upon said blade.

9. An aerogenerator in accordance with claim 5 wherein said system for regulating the velocity of rotation of said rotor controls said velocity as a function of the value of energy required to be produced by said system.

10. An aerogenerator in accordance with claim 5 wherein said system for regulating the velocity of rotation of said rotor comprises means for automatically controlling the angular movement of said axis in a vertical plane which is parallel to the direction of incident wind upon said rotor.

11. An aerogenerator in accordance with claim 10 wherein said rotor is positioned within a plane inclined with respect to the vertical at an initial position in which it presents a maximum attack surface to the wind, said rotor being adapted to move from said initial position as a function of the intensity of the wind or of the value of energy required, and to a final limit position in which it presents a minimal attack surface to the wind, whereby velocity of said rotor varies in accordance with the attack surface presented to the wind.

12. An aerogenerator in accordance with claim 5 wherein said axis has a cap at one end, said rotor being journalled within said cap and including shock absorption means positioned on opposite sides of said axis.

13. An aerogenerator in accordance with claim 12 wherein said shock absorption means comprise hydraulic shock absorbers which cooperate with said cap.

14. An aerogenerator in accordance with claim 5 wherein said rotor is mounted on a swivel joint integral with the rotating shaft, said rotor being located between said two side plates, said two side plates also being integrally attached to said shaft, said side plates and said rotor being connected by shock absorption apparatus.

15. An aerogenerator in accordance with claim 5 further comprising a deformable quadrilateral structure attached to an upper plate which carries said rotor and said generator and said shaft, said structure comprising at least two unequal length connecting rods journalled to a lower plate, said lower plate being adapted to rotate about a vertical axis.

16. An aerogenerator in accordance with claim 10 wherein said rotor is positioned within a plane inclined with respect to the vertical at an initial position in which it presents a maximum attack surface to the wind, said rotor being adapted to move from said initial position as a function of the intensity of the wind or of the value of energy required to a second position in which it presents a reduced attack surface to the wind, whereby the velocity of said rotor varies in accordance with the attack surface of the rotor which is presented to the wind.

* * * * *

UNITED STATES PATENT AND TRADEMARK OFFICE
CERTIFICATE OF CORRECTION

PATENT NO. : 4,415,813

DATED : November 15, 1983

INVENTOR(S) : Anne M. CARME

It is certified that error appears in the above-identified patent and that said Letters Patent is hereby corrected as shown below:

In Column 1, line 53, after "means", insert ---for---.
In Column 1, line 49, "blade carrying" should read ---blade-carrying---.
In Column 2, line 19, change "." to ---;---.
In Column 2, line 22, after "reference", insert ---line---.
In Column 2, line 35, after "rotor 2", insert ---;---.
In Column 2, line 38, after "transforming", delete "of".
In Column 2, line 50, after "at", insert ---an---.
In Column 3, line 5, after "two-by-two", insert ---and---.
In Column 3, line 50, after "attack", insert ---surface---.
In Column 3, line 63, after "platform, insert ---13---.
In Column 4, line 26, "deformably" should read ---deformable---.
In Column 4, line 56, after "line", delete "in".
In Column 6, line 2, after "pivot", delete "the".
In Column 6, line 61, change "driving angularly" to ---and drives---.
In Column 6, line 63, after "controls", insert ---,---.
In Column 7, line 1, after "through", insert ---the---.
In Column 7, line 1, before "shaft", delete "the".
In Column 7, line 11, after "located", change ". Apparatus" to ---, apparatus---.
In Column 7, line 45, delete "the".
In Column 7, line 49, delete "axis 1", and substitute ---the---.
In Column 7, line 49, delete "the" and substitute ---axis 1---.
In Column 8, line 8, after "hand", insert ---,---.
In Column 8, line 23, after "54", insert ---, either---.
In Column 8, line 24, after "in", insert ---either---.
In Column 8, line 36, delete "said".

UNITED STATES PATENT AND TRADEMARK OFFICE
CERTIFICATE OF CORRECTION

PATENT NO. : 4,415,813

DATED : November 15, 1983

INVENTOR(S) : Anne M. CARME

It is certified that error appears in the above-identified patent and that said Letters Patent is hereby corrected as shown below:

In Column 8, line 41, delete "a measurement".
In Column 8, line 63, after "exists", insert ---,---.
In Column 8, line 64, delete "before" and substitute ---for---.
In Column 8, line 64, "rotably" should read ---rotatably---.
In Column 9, line 18, before "e.g.,", insert ---,---.
In Column 9, line 28, before "e.g.,", insert ---,---.
In Column 9, line 30, before "e.g.,", insert ---,---.
In Column 9, line 31, before "54", insert ---device---.
In Column 9, line 59, delete "for example".
In Column 9, line 61, before "e.g.,", insert ---,---.
In Column 9, line 65, after "apparatus", insert ---,---.

Signed and Sealed this

Seventeenth Day of July 1984

[SEAL]

Attest:

GERALD J. MOSSINGHOFF

*Attesting Officer* — *Commissioner of Patents and Trademarks*